United States Patent
Yamazaki et al.

(10) Patent No.: US 7,196,804 B2
(45) Date of Patent: Mar. 27, 2007

(54) IMAGE PROCESSING APPARATUS AND METHOD, AND STORAGE MEDIUM USED THEREWITH

(75) Inventors: Hiroyuki Yamazaki, Shizuoka (JP); Shoichi Koyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 438 days.

(21) Appl. No.: 09/725,035

(22) Filed: Nov. 29, 2000

(65) Prior Publication Data

US 2001/0002827 A1 Jun. 7, 2001

(30) Foreign Application Priority Data

Dec. 2, 1999 (JP) ................. 11-343142

(51) Int. Cl.
*G06F 15/00* (2006.01)
*G06K 1/00* (2006.01)

(52) U.S. Cl. ............... 358/1.15; 358/1.14; 358/1.9; 358/3.28; 382/100

(58) Field of Classification Search ............... 358/3.28, 358/1.9, 1.14, 464, 1.15; 382/100, 162, 232, 382/296, 118, 10; 380/201, 205, 54, 246; 705/50, 57, 75; 713/176, 185; 348/463; 283/75

See application file for complete search history.

(56) References Cited

U.S. PATENT DOCUMENTS

| | | | |
|---|---|---|---|
| 4,637,679 A | 1/1987 | Funato | 350/6.5 |
| 5,652,626 A * | 7/1997 | Kawakami et al. | 348/463 |
| 6,095,566 A * | 8/2000 | Yamamoto et al. | 283/75 |
| 6,233,684 B1 * | 5/2001 | Stefik et al. | 713/176 |
| 6,252,971 B1 * | 6/2001 | Wang | 382/100 |
| 6,298,142 B1 * | 10/2001 | Nakano et al. | 382/100 |
| 6,384,935 B1 * | 5/2002 | Yamazaki | 358/1.9 |
| 6,438,251 B1 * | 8/2002 | Yamaguchi | 382/100 |
| 6,590,996 B1 * | 7/2003 | Reed et al. | 382/100 |
| 6,700,991 B1 * | 3/2004 | Wu et al. | 382/100 |
| 6,724,921 B2 * | 4/2004 | Yamaguchi | 382/118 |
| 6,763,122 B1 * | 7/2004 | Rodriguez et al. | 382/100 |
| 6,850,624 B1 * | 2/2005 | Shinoda et al. | 382/100 |
| 6,912,069 B1 * | 6/2005 | Matsunoshita | 358/3.28 |
| 7,058,196 B2 * | 6/2006 | Takaragi | 382/100 |
| 2004/0125983 A1 * | 7/2004 | Reed et al. | 382/100 |

FOREIGN PATENT DOCUMENTS

| EP | 0 551 016 A1 | 12/1992 |
|---|---|---|
| EP | 0 655 853 A2 | 11/1994 |
| EP | 0 892 544 A2 | 1/1999 |

\* cited by examiner

*Primary Examiner*—Kimberly Williams
*Assistant Examiner*—Satwant Singh
(74) *Attorney, Agent, or Firm*—Fitzpatrick, Cella, Harper & Scinto

(57) ABSTRACT

An image processing apparatus forms an image by using a plurality of light-emitting devices to display each color. The image processing apparatus includes an input unit for inputting image information representing the image, and an adding unit for adding predetermined information to the image information so that the it can hardly be recognized y human eyes. The adding unit is provided corresponding to not all the light-emitting devices but some of the light-emitting devices.

16 Claims, 14 Drawing Sheets

FIG. 11

| PROTOCOL TYPE | NETWORK ID |
|---|---|
| USER ID | TIME OF PRINTING |
| MANUFACTURER NAME | MACHINE TYPE |
| SERIAL NUMBER ||

IMAGE PROCESSING APPARATUS AND METHOD, AND STORAGE MEDIUM USED THEREWITH

BACKGROUND OF THE INVENTION

1. Field of the Invention

The present invention relates to image processing apparatuses and methods, and to storage media used therewith.

2. Description of the Related Art

Recently, image forming apparatuses, such as color printers and color copying machines, can form high quality images because the apparatuses have improved in performance. Due to the improvement, the apparatuses are becoming able to form images similar to those of bank notes, securities, etc. Accordingly, it is likely that problems such as forgery of bank notes and securities, and piracy of copyright, will increase in future.

As one of prevention, an addition method is known in which, for example, a dot pattern indicating the serial number of an image processing apparatus is added to a color image printed by the image processing apparatus so that it is imperceptible to human eyes.

Normally, the dot pattern has a predetermined size, and a plurality of dots are arranged in the predetermined size. Additional information can be represented by the arrangement of the dots. The dot pattern is repeatedly printed on the entire area of the image. In order that the dot pattern may be imperceptible to human eyes, when the dot pattern is added to a color image composed of yellow, magenta, cyan, and black planes, it is normally added only to the yellow plane.

By performing the above-described addition of the dot pattern, when an image that is not allowed to be formed or an image that is not allowed to be reproduced appears, the added dot pattern is extracted and additional information (a serial number) represented by the pattern can be decoded, whereby the apparatus used to form the image can be determined.

An example of a conventional 1-dot pattern is shown in FIG. 1. In FIG. 1, each square indicates a pixel formed by an image forming apparatus. Each black square is a pixel which bears the color. Each white square is a blank pixel. Other pixels (not shown) are used to display information based on image data.

One image forming unit or one row of image forming units such as lasers and light-emitting devices are used in a conventional image forming apparatus. However, it is likely that at least two image forming units or at least two rows of image forming units will be used in order to accelerate the image formation. In this construction, in order to add conventional dot patterns, a specific pattern adding unit must be provided for each image forming unit. This inevitably increases the production cost.

The conventional dot pattern causes the following problems. First, if the dot pattern is formed in yellow, it can be easily seen, particularly when it is highlighted. This causes deterioration in image quality. Second, a dot pattern which is formed of dots generated by dithering or the like cannot be extracted since it is superficially covered with the generated dots. Third, due to precision of component units for synchronizing the start positions of lines constituting an image, the positioning precision of each laser, etc., each line may be shifted in position in the a main-scanning direction. This positional shift greatly affects a conventional dot pattern, so that the dot pattern cannot be decoded.

SUMMARY OF THE INVENTION

Accordingly, it is an object of the present invention to provide an image processing apparatus and method for solving at least one of the foregoing problems, and a storage medium used therewith.

It is another object of the present invention to provide an image processing apparatus and method for adding predetermined information to an image, even if at least two image forming units (e.g., light-emitting devices) in an image forming apparatus are used to increase the processing speed, and a storage medium used therewith.

It is a further object of the present invention to provide an image processing apparatus and method for adding predetermined information to an image while reducing the production cost, even if at least two image forming units (e.g., light-emitting devices) in the image forming apparatus are used to increase the processing speed, and a storage medium used therewith.

It is a still further object of the present invention to provide an image processing apparatus and method that add predetermined information to an image so that the information can be easily extracted, while suppressing deterioration in image quality, and a storage medium used therewith.

To these ends, according to an aspect of the present invention, the above-described objects are achieved through provision of an image processing apparatus for forming an image by using a plurality of light-emitting devices to display each color. The image processing apparatus includes an input unit for inputting image information representing the image, and an adding unit for adding predetermined information to the input image information so that the predetermined information is imperceptible to human eyes, and one or some of the light-emitting devices have the adding unit.

According to another aspect of the present invention, the above-described objects are achieved through provision of an image processing apparatus for forming an image by using a plurality of light-emitting devices to display each color. The image processing apparatus includes an input unit for inputting image information representing the image, and an adding unit for adding predetermined information to the input image information so that the added predetermined information is imperceptible to human eyes, and the predetermined information is supplied from the adding unit to the plurality of light-emitting devices.

According to a further aspect of the present invention, the foregoing objects are achieved through provision of an image processing method for forming an image by using a plurality of light-emitting devices to display each color. The image processing method includes the steps of inputting image information representing the image, and adding predetermined information to the input image information so that the added information is imperceptible to human eyes, and the predetermined information in the adding step is supplied to some of the light-emitting devices.

According to a still further aspect of the present invention, the foregoing objects are achieved through provision of a computer-readable storage medium containing an image-processing-program code for forming an image by using a plurality of light-emitting devices to display each color. The image-processing-program code includes an input code for inputting image information representing the image, and an adding code for adding predetermined information to the input image information so that the added information is imperceptible to human eyes, and the adding code supplies the predetermined information to some of the light-emitting devices.

Further objects, features and advantages of the present invention will become apparent from the following description of the preferred embodiments with reference to the attached drawings.

BRIEF DESCRIPTION OF THE DRAWINGS

FIG. 11 is an illustration of encrypted information in a first embodiment of the present invention;

DESCRIPTION OF THE PREFERRED EMBODIMENTS

Preferred embodiments of the present invention are described below with reference to the attached drawings.

Figure 1:
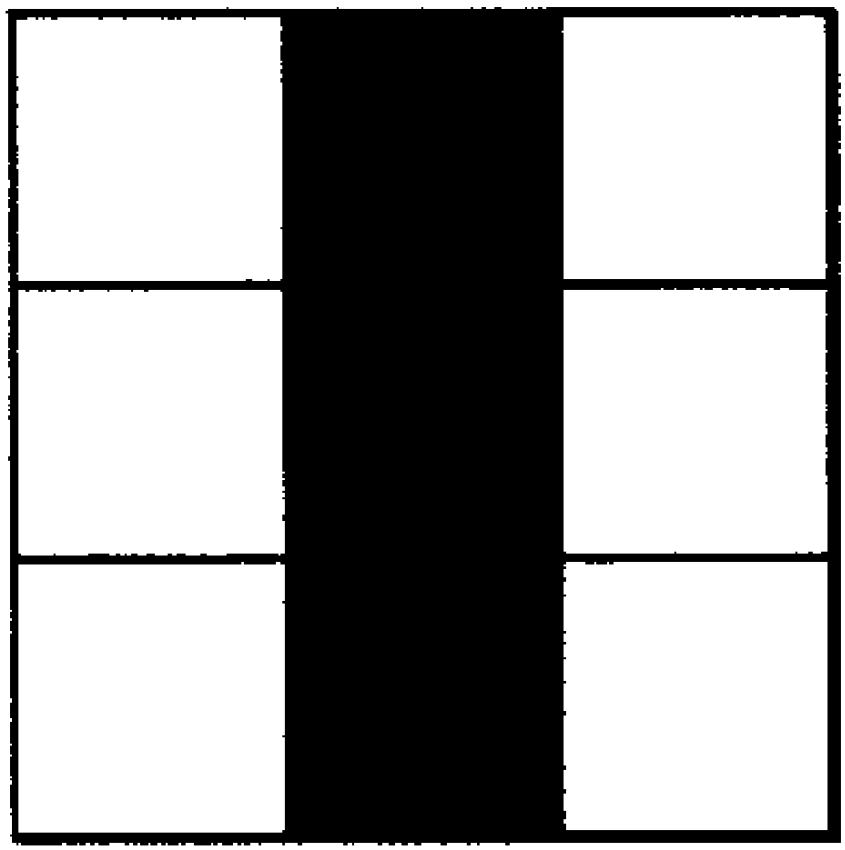
FIG. 1 is an illustration of a conventional dot pattern.
Figure 2:
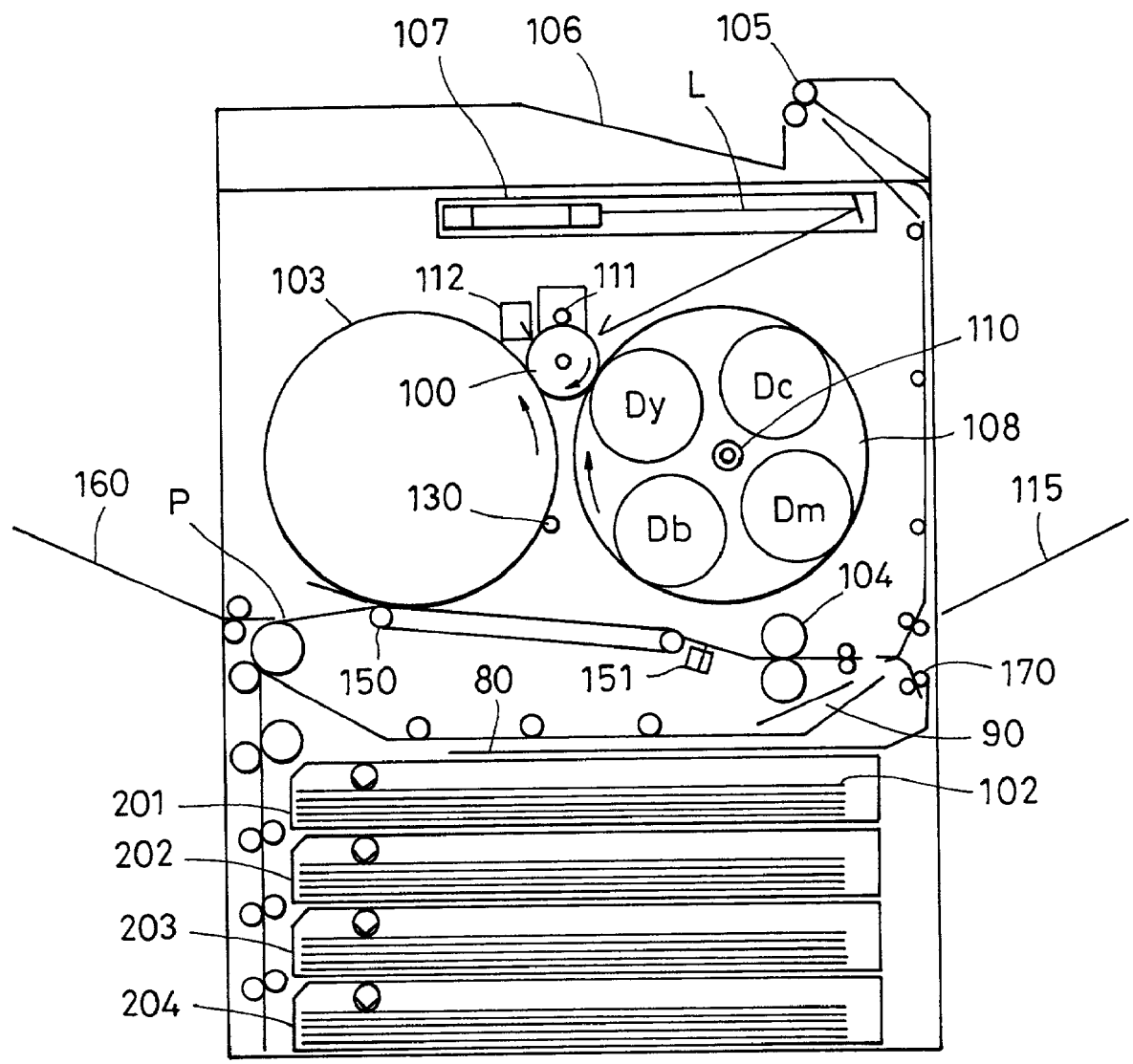
FIG. 2 is a section view of a color image forming apparatus according to a first embodiment of the present invention.

Referring to FIG. 2, a schematic sectional view of a color image forming apparatus according to a first embodiment of the present invention is shown. In the first embodiment, the present invention is applied to a rotary-type printer including only a single photosensitive body. The printer forms a color image on the photosensitive body by repeatedly performing a number of image-forming cycles which is identical to the number of developer colors. Obviously, the present invention can also be applied to image processing apparatuses such as copying machines and tandem-type printers that include photosensitive bodies corresponding to colors required for image formation, a charging unit, and a developing unit.

In the first embodiment, a color laser printer is used as the color image forming apparatus. An optical unit 107 used in the color image forming apparatus employs a method called "Multibeam" or "Triple Beam" in which a latent image is formed using a plurality of laser beams.

In FIG. 2, latent images are formed on a photosensitive drum 100 in accordance with image information for each color which is sent from the optical unit 107 based on an image-top (TOP) signal. The formed latent images are sequentially developed by a yellow (Y) developing unit Dy, a cyan (C) developing unit Dc, a black (B) developing unit Db, and a magenta (M) developing unit Dm in a developing-unit holder 108, and the developed images are transferred onto an image carrier 103 a number of times, whereby a multicolored image is formed on the image carrier 103. Subsequently, a transfer material P, selectively extracted from among transfer material holders 201 to 204, is carried to a position between the image carrier 103 and a transfer-and-carry belt 150, whereby the multicolored image on the image carrier 103 is transferred onto the transfer material P. The transferred multicolored image on the transfer material P is thermally fixed by a fixer unit 104. The transfer material P is discharged to an upper discharging tray 106 or a lower discharging tray 115 by a discharging unit 105.

The specific operation of the mentioned color laser printer is described below.

First, the photosensitive drum 100 is uniformly charged (e.g., at −600 V) to have a predetermined polarity by the charger unit 111. In accordance with image data sent based on the TOP signal from a controller, a laser beam L exposes the photosensitive drum 100 to form a latent image. For example, the M developing unit Dm develops the latent image on the photosensitive drum 100. The developed image is formed on the photosensitive drum 100. A first transfer high voltage (e.g., +200 V) which has a polarity (e.g., a positive polarity) opposite to that of the developer is applied to the image carrier 103 with predetermined timing, and the developed image with the first developer (hereinafter referred to as the "first developer image") is transferred onto the image carrier 103. After that, the first developer remaining on the photosensitive drum 100 is removed by a cleaner 112, and the next process of latent image formation and development is awaited. After processing for the first developing color finishes, the laser beam L exposes the photosensitive drum 100 to form a latent image in a second color (e.g., cyan), and a second developing unit uses a second developer to develop the latent image to form an image developed with the second developer (hereinafter referred to as a "second developer image"). The second developer image is transferred onto the image carrier 103, as described above, so as to match the head position of the initially transferred first developer image. Similarly, third and fourth latent images are sequentially formed on the photosensitive drum 100, the latent images are developed by third and fourth developing units, and the developed images are transferred onto the image carrier 103 to match the already transferred images, whereby images (hereinafter referred to as "4-color developer images") developed with 4-color developers are formed on the image carrier 103 so as to be superimposed on one another. After that, when the head portion of the image carrier 103, onto which the 4-color developer images are transferred, approaches a position for image transfer, a high voltage (e.g., +2 kV) is applied to the transfer-and-carry belt 150, and the transfer-and-carry belt 150 is brought into contact with the image carrier 103. The transfer material P from one of the transfer material holders 201 to 204 is carried to a position between the image carrier 103 and the transfer-and-carry belt 150 so as to match the 4-color developer images, and image transfer is performed. By applying a voltage (e.g., −1 kV), which has an inverse polarity to the bias applied to the transfer-and-carry belt 150, to a charge remover 151 disposed after the transfer-andcarry belt 150, or by grounding the charge remover 151, the charge remover 151 operates to remove accumulated charge on the transfer material P until the end portion of the transfer material P leaves the transfer-and-carry belt 150. When the end portion of the transfer material P reaches a transfer-end position (i.e., the end of the nip between the image carrier 103 and the transfer-and-carry belt 150), a first transfer high voltage applied to the image carrier 103 is removed (set to ground potential).

When the end portion of the transfer material P is carried from the transfer-and-carry belt 150, the high voltages applied to the transfer-and-carry belt 150 and the charge remover 151 are removed. At this time, the transfer-and-carry belt 150 is separated from the image carrier 103. Next, the transfer material P, separated from the transfer-and-carry belt 150, is carried to the fixer unit 104, in which the 4-color developer images are thermally fixed on the transfer material P, and the image-fixed transfer material P is discharged onto either the lower discharging tray 115 or the upper discharging tray 106. When the transfer from the image carrier 103 to the transfer material P begins and the head portion of the transferred image approaches a cleaning roller 130, the cleaning roller 130 is brought into contact with the image carrier 103. By applying, to the cleaning roller 130, a bias having a polarity identical to that of the transfer-and-carry belt 150, transferred inverse-polarity developers remaining on the image carrier 103 are attracted for cleaning by the cleaning roller 103. Also, the polarity of the polarity-converted remaining developers is enhanced, and the enhanced polarity remaining developers are returned to the photosensitive drum 100 for the next print sequence by the image carrier 103.

When printing on both surfaces of the transfer material P is performed, the transfer material P obtained after the above-described print sequence is put on a multipaper tray 160, with the image-fixed surface thereof facing down, and the above-described print sequence is performed again, or the transfer material P obtained after the above-described print sequence is put on any one of the transfer material holders 201 to 204, with the image-fixed surface thereof facing up. Otherwise, after fixing the developer image on the transfer material P in the print sequence, the transfer material P is carried toward a 2-surface unit 90, and a switching-back roller 170 of the 2-surface unit 90 is rotated so that the transfer material P is held. Before the rear end of the transfer material P reaches the switching-back roller 170, the switching-back roller 170 is controlled to rotate in a reverse direction, whereby the transfer material P is carried to a transfer material carrying path 80 in the 2-surface unit 90 below the fixer unit 104. Subsequently, after the transfer material P is picked up from the 2-surface unit 90, and the above-described print sequence is performed, the transfer material P having the developer image fixed on both surfaces is discharged to the lower discharging tray 115 or the upper discharging tray 106, so that the transfer material P having two image-printed surfaces is obtained.

The foregoing description is an outline of printing processing in the color laser printer used in the first embodiment. By using this color laser printer, an extremely-precise highly-reproducible multicolored image can be obtained.

Figure 3:
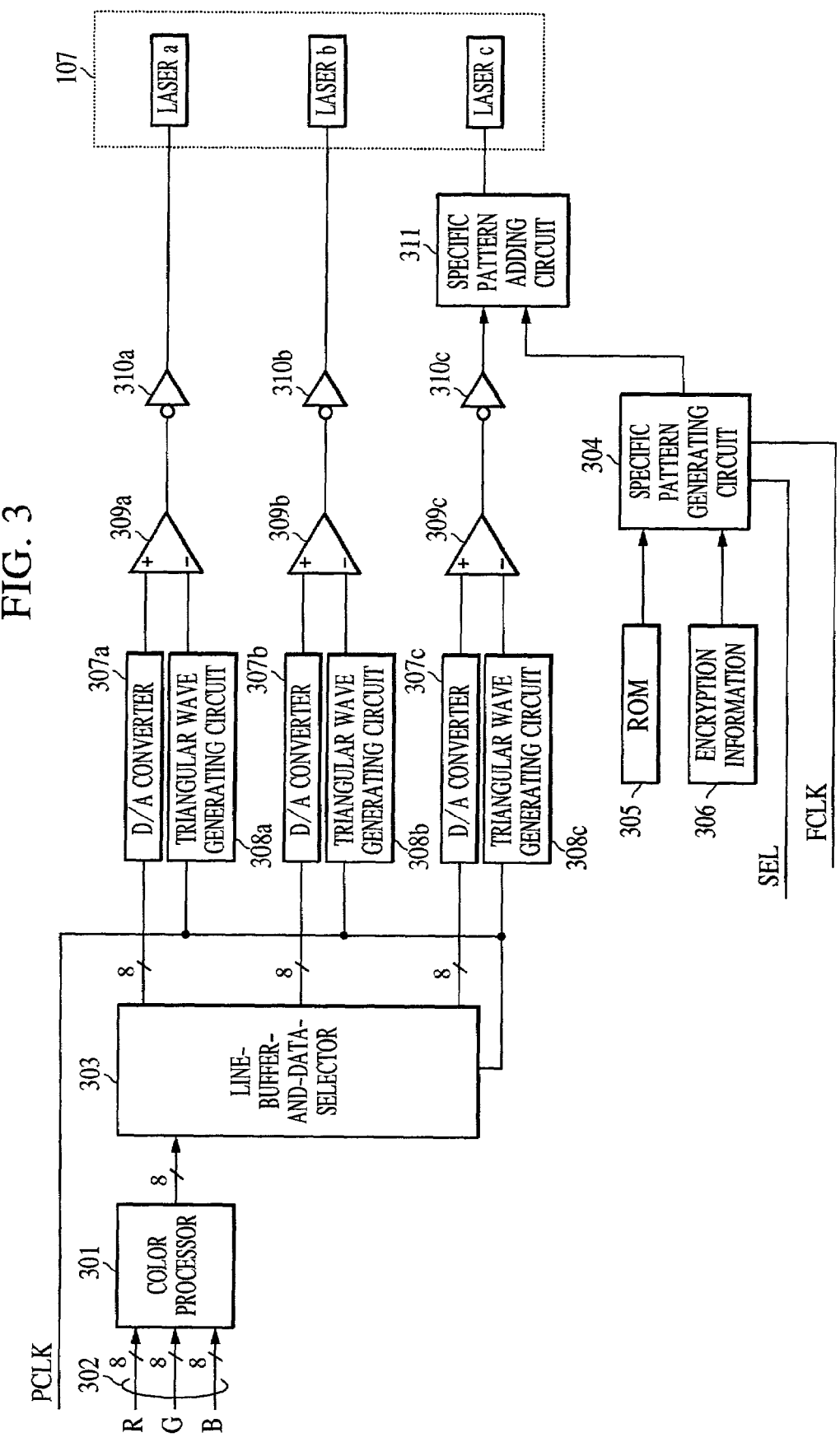
FIG. 3 is a block diagram showing the relationship between image data in a first embodiment of the present invention and a method for adding a specific pattern.

FIG. 3 shows the relationship between image data sent to the optical unit 107 of the color image forming apparatus according to the first embodiment and addition of a specific pattern. Since the optical unit 107 used in the first embodiment generally employs the "Multibeam" or "Triple Beam" method, the method is mentioned in the following description. In FIG. 3, a color processor 301 converts red (R), green (G), and blue (B) 8-bit image data 302 into image-forming colors (cyan, magenta, yellow, and black) used in the image forming apparatus according to the first embodiment, and performs density-correcting processing in accordance with the output characteristics of the image forming apparatus. Since the image forming apparatus according to the first embodiment is a rotary type and sequentially forms images, the color processor 301 performs corresponding conversion into image-forming data for each image. Specifically, the color processor 301 outputs 8-bit image signals. For example, the color processor 301 first outputs an image signal representing magenta image data, second outputs a image signal representing cyan image data, third outputs an image signal representing yellow image data, and fourth outputs an image signal representing black image data. The image signals are sequentially output from the color processor 301 to a line-buffer-and-data-selector 303. In synchronization with a picture synchronizing clock signal PCLK, image data are output in units of pixels from the line-buffer-and-data-selector 303. The image data are outputted for three lasers used in the image forming apparatus according to the first embodiment.

The image data extracted for the lasers are input to digital-to-analog (D/A) converters 307a to 307c. Each of the D/A converters 307a to 307c converts the input image data into an analog voltage corresponding to the signal level of the image data, and inputs the voltage to one input terminal of each of analog comparators 309a to 309c. Each of triangular wave generating circuits 308a to 308c generates a triangular-wave signal based on the signal PCLK, and inputs the triangular-wave signal to the other input terminal of each of the analog comparators 309a to 309c. The analog comparators 309a to 309c each compare the two input signals, namely, the analog voltage and the triangular-wave signal, and output pulse-width-modulated (PWM) image signals. Inverters 310a to 310c invert the PWM signals to generate inverted PWM signals.

Before that, based on read-only-memory (ROM) information 305 and encryption information 306 for use in encryption, a specific pattern generating circuit 304 generates a specific pattern. The ROM information 305 and the encryption information 306 each include, for example, at least one of a network environment, a manufacturer name, a machine type, a serial number, copyright information, and an image forming time. In addition to these, other types of information may be used. The specific pattern generating circuit 304 determines, based on a select (SEL) signal, whether to output a specific pattern, in synchronization with an image-forming color used in the image forming apparatus. The SEL signal represents output only when the image-forming color is yellow, and the specific pattern generating circuit 304 outputs a specific pattern.

When determining whether to output the specific pattern, the specific pattern generating circuit 304 outputs specific pattern data to a specific pattern adding circuit 311 in synchronization with a clock signal FCLK. The signal FCLK has a frequency identical or close to that of the signal PCLK. The signal PCLK itself may be used as the signal FCLK.

By using logical processing such as logical multiplication or logical addition to process the inverted PWM signal output from the inverter 310c and the data output from the specific pattern generating circuit 304, the specific pattern adding circuit 311 adds the specific pattern to the image data, in synchronization with the signal FCLK. The inverted PWM signal to which the specific pattern is added is input to a laser c in the optical unit 107 for driving a semiconductor laser. At the same time, the inverted PWM signals output from the inverters 310a and 310b are directly input to a laser a and a laser b which are semiconductor lasers.

Figure 4:
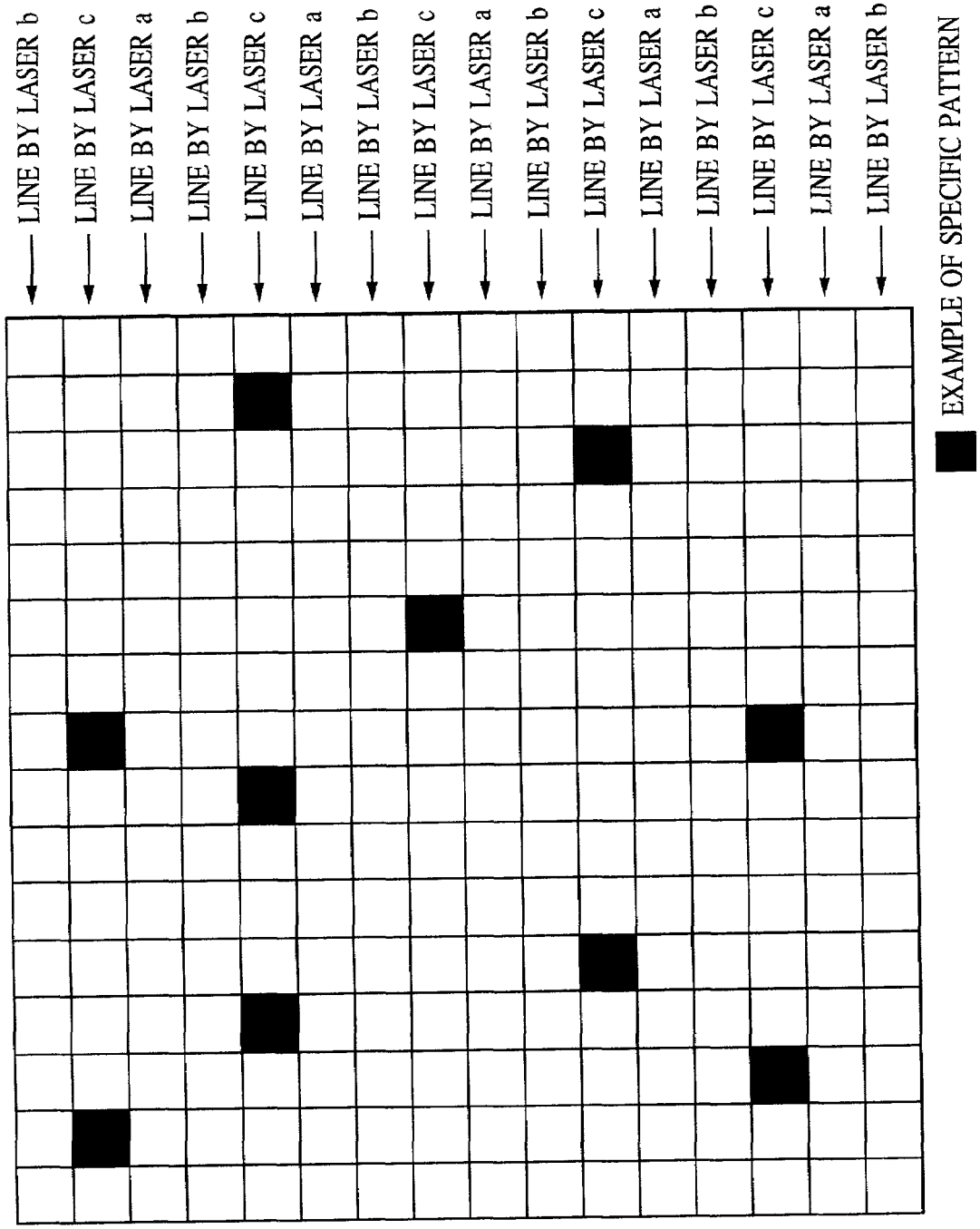
FIG. 4 is an illustration of one dot of a specific pattern in a first embodiment of the present invention.

Referring to FIG. 4, a specific pattern used in the first embodiment and examples of image information for the laser a to laser c are shown. In FIG. 4, each of the regions defined by frames is a unit of dots (pixels) formed by the laser a to laser c, and the regions are formed on the photosensitive drum 100 by PWM laser beams. Part of the specific pattern is shown in FIG. 4. An actual specific pattern is formed by a repetitive pattern including the part of the specific pattern shown in FIG. 4. The repetitive pattern is added in the vertical and horizontal directions of the transfer material P. As shown in FIG. 4, features of the specific pattern are formed on laser c lines. The specific pattern shown in FIG. 4 is added to the image data by the specific pattern adding circuit 311.

Figure 5:
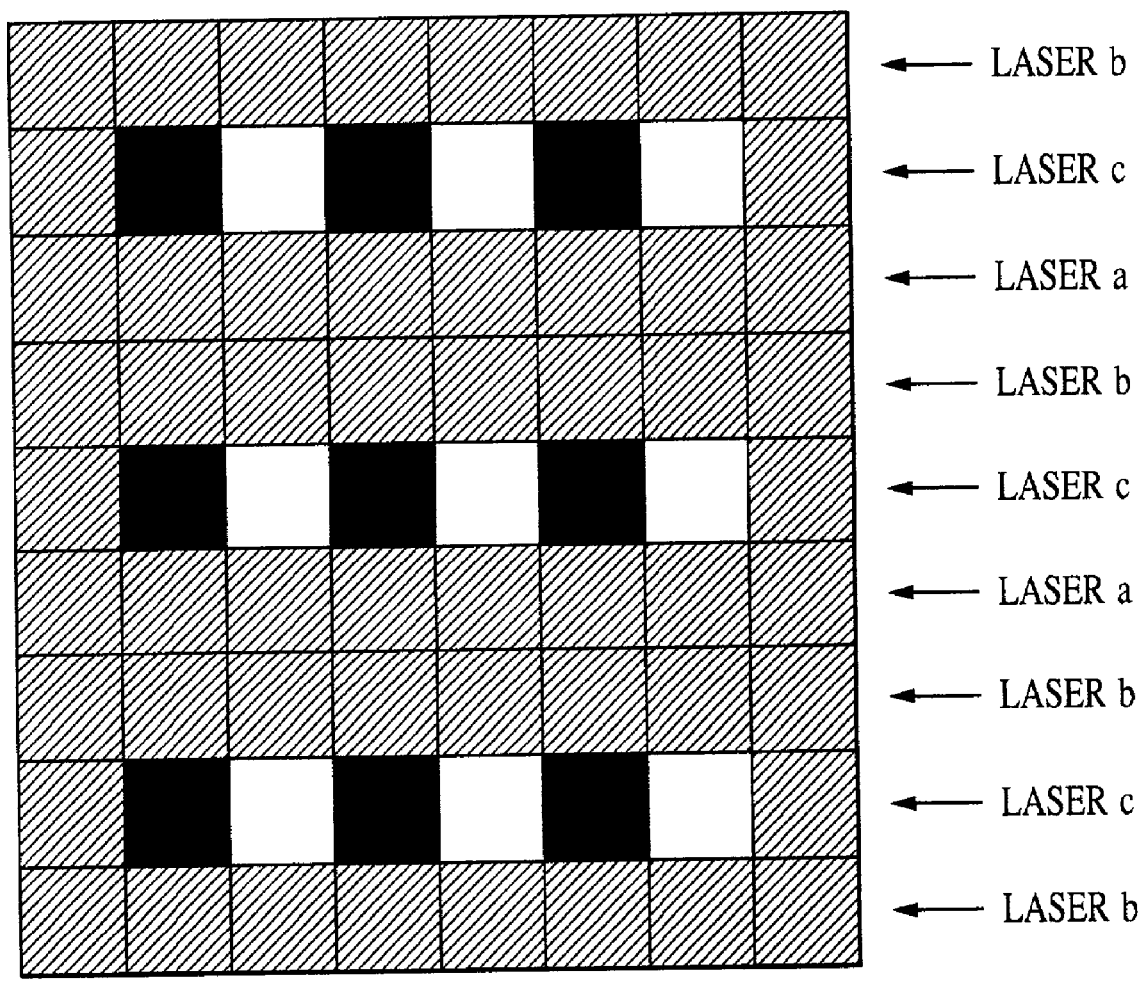
FIG. 5 is an illustration of one dot of a specific pattern in a first embodiment of the present invention.

Referring to FIG. 5, the specific pattern used in the first embodiment and examples of image information corresponding to the laser a to laser c are shown.

FIG. 5 specifically shows a dot (hereinafter referred to as an "additional dot") of the specific pattern used in the first embodiment. FIG. 5 also shows only a yellow plane. The squares are pixel units constituting a formed image. In FIG. 5, the black squares are pixels bearing yellow, and the blank squares are pixels bearing white, in which yellow is removed. The hatched squares are pixels that bear yellow caused by PWM laser beams. As shown in FIG. 5, nine pixels bearing yellow and nine pixels that do not bear yellow constitute one additional dot. This additional dot includes pixels bearing yellow and pixels that do not bear yellow. In other words, a region composed of pixels having modulated densities of yellow is divided into three parts in a sub-scanning direction (e.g., the horizontal direction in FIG. 5). In the first embodiment, the specific pattern is formed based on the signal FCLK which is different from the signal PCLK. Thus, each pixel based on the image data and the additional dot are formed so as to be shifted from each other. Particularly, in an electrographic image forming apparatus, when nine pixels bearing yellow are formed as shown in FIG. 5, they interact with one another in a highlighted portion to form one large light-colored dot. In particular, in the highlighted portion which is visible, this type of large light-colored dot is hidden. This can prevent deterioration in image quality.

As shown in FIG. 5, the pixels bearing yellow and the pixels that do not bear yellow are all formed on the lines drawn by the laser c. Accordingly, the above prevention of deterioration in image quality can be achieved by processing for adding a specific pattern only to the inverted PWM signal for the laser c, as in the first embodiment.

Figure 6:
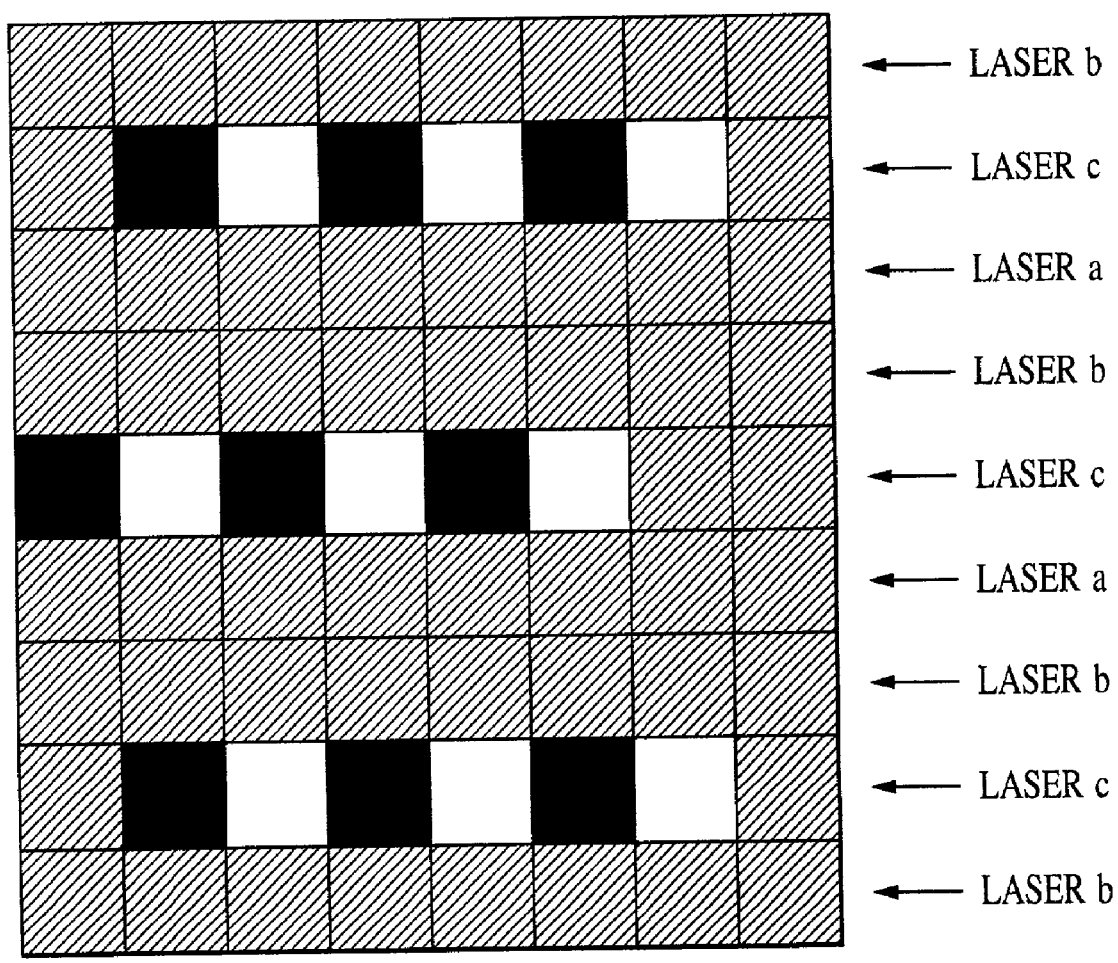
FIG. 6 is an illustration of one dot of a specific pattern in a first embodiment of the present invention.

The start position of each line is controlled by a horizontal synchronizing signal. The specific pattern is shifted for each line by approximately one pixel in the main-scanning direction because it is generated using the signal FCLK. When the additional dot shown in FIG. 5 is shifted by one pixel, the form of the dot changes into, for example, the form shown in FIG. 6. However, since the pixels bearing yellow and the pixels that do not bear yellow are disposed with a distance provided therebetween, no great change is found in the additional dot. Accordingly, the additional dot is hardly affected by the positional shift.

Figure 7:
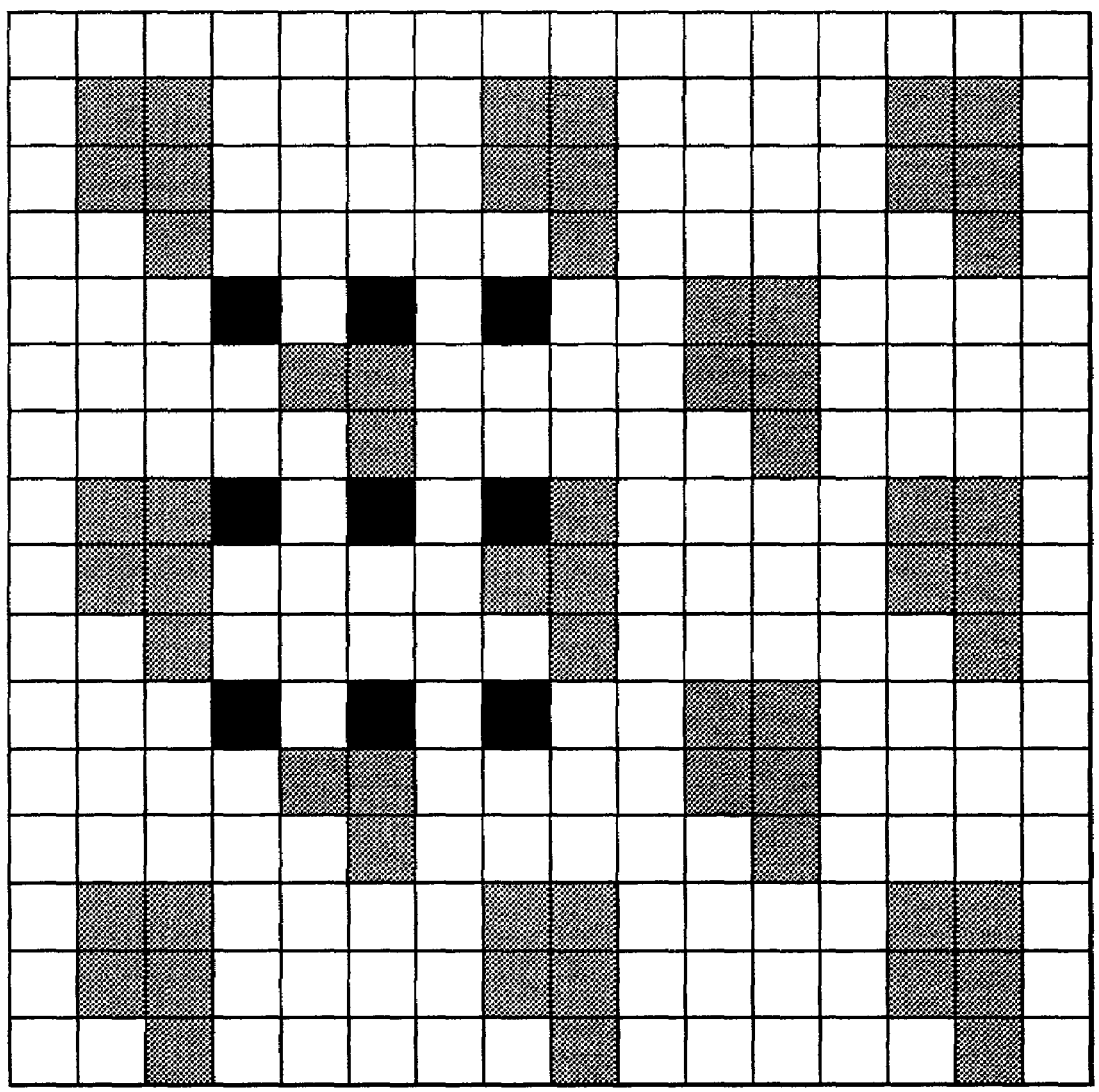
FIG. 7 is an illustration of the relationship between a specific pattern and spots in a first embodiment of the present invention.

Referring to FIG. 7, the additional dot shown in FIG. 5 is embedded in pixels generated from image data by halftone processing such as dithering. FIG. 7 shows the result of the dithering of a yellow plane. Each square indicates a pixel. The hatched squares indicate spot pixels. The black squares indicate a specific pattern. Even when the specific pattern is embedded in the spot pixels, it can be easily extracted regardless of its positional relationship with the spot pixels.

Figure 8:
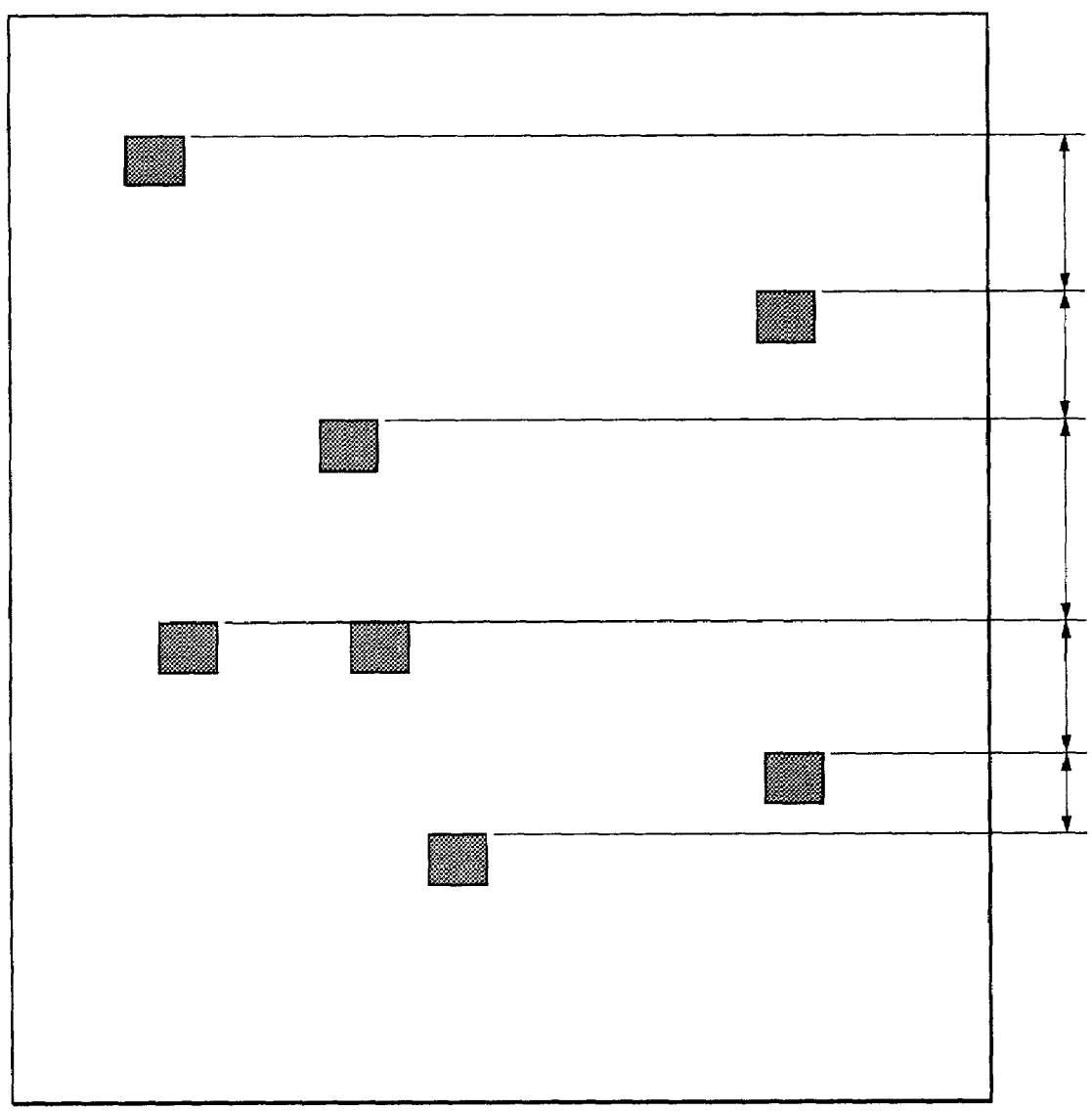
FIG. 8 is an illustration of an arrangement of a specific pattern in a first embodiment of the present invention.

By combining a plurality of additional dots, a specific pattern is formed. FIG. 8 shows an example of a specific pattern. The hatched squares indicate additional dots as shown in FIG. 5. An arrangement of the additional dots represents a predetermined code. FIG. 8 shows a specific pattern minimum unit. Actually, a specific pattern is formed by repeatedly adding the minimum unit to an image in the vertical (sub-scanning) and horizontal (main-scanning) directions. In FIG. 8, line intervals among the additional dots are set so as to be multiples of 3. Accordingly, any one of the additional dots can be formed by the laser c.

Figure 9:
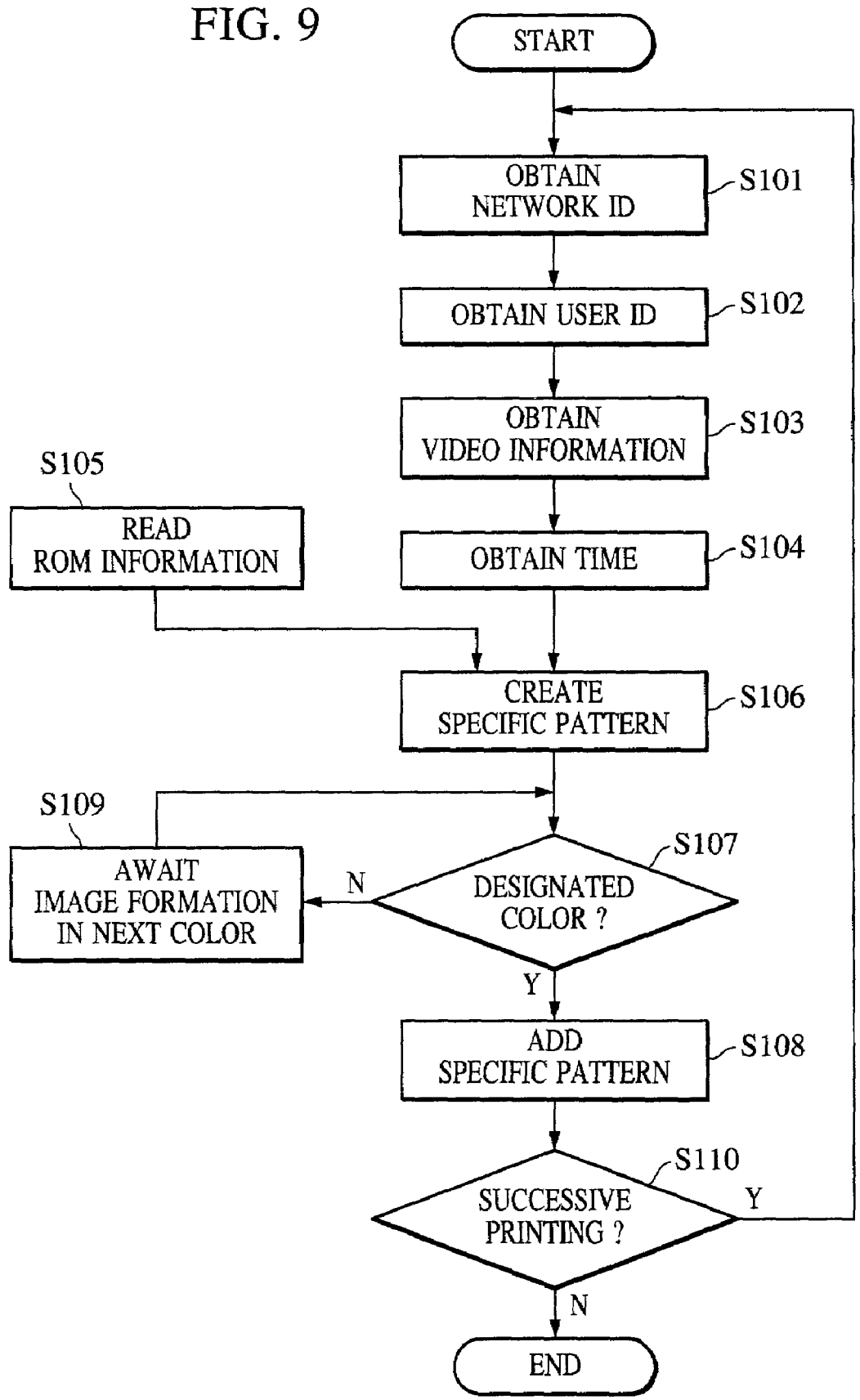
FIG. 9 is a flowchart illustrating a process for adding a specific pattern in a first embodiment of the present invention.

With reference to FIG. 9, a process for adding a specific pattern in the first embodiment is described below.

When the image forming apparatus is connected to a host computer via a network when performing printing, the process obtains a network ID in step S101. If the image forming apparatus is directly connected to the host computer by connection cables, the process skips over step S101.

Here, a process in step S101 for obtaining the network ID is described below with reference to FIG. 10. In the following description, it is assumed that the image forming apparatus according to the first embodiment supports one of the Ethernet, the Netware, the AppleTalk, and the Transmission Control Protocol and the Internet Protocol (TCP/IP).

Figure 10:
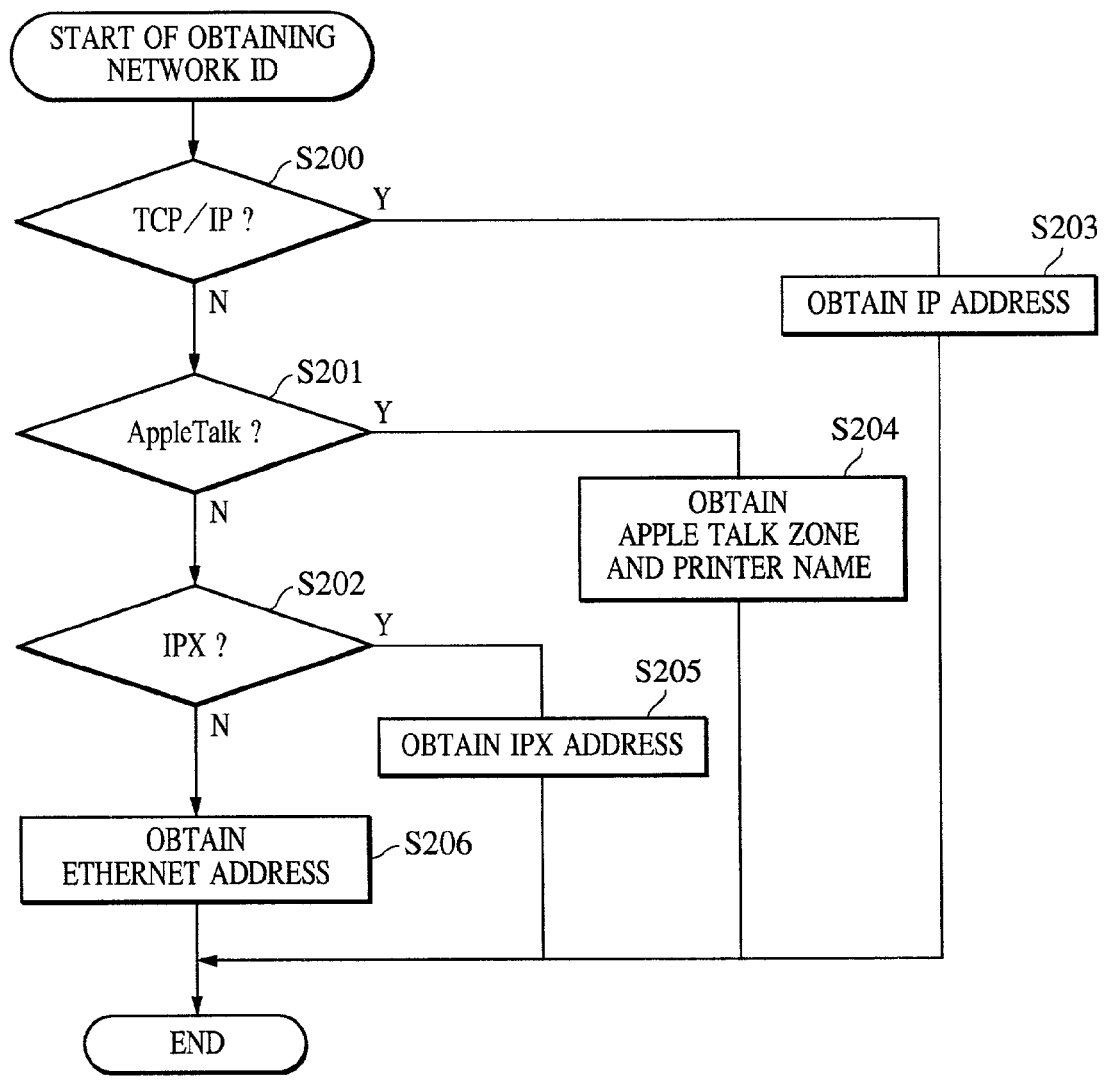
FIG. 10 is a flowchart illustrating a process for obtaining a network ID in a first embodiment of the present invention.

In FIG. 10, in step S200, the process determines whether the network for connection is the TCP/IP.

If the process determines affirmatively in step S200, it proceeds to step S203, and obtains an Internet protocol (IP) address.

If the process determines negatively in step S200, it proceeds to step S201, and determines whether the network for connection is the AppleTalk.

If the process has determined in step S201 that the network for connection is the AppleTalk, it proceeds to step S204, and obtains the Apple Talk Zone and a printer name.

If the process has determined in step S201 that the network for connection is not the AppleTalk, it proceeds to step S202, and determines whether the network for connection is the Netware.

If the process has determined in step S202 that the network protocol of the Netware is the Internetwork Packet Exchange (IPX), the process proceeds to step S205, and obtains an IPX address.

If the process has determined in step S202 that the network for connection is not the Netware, it proceeds to step S206, and obtains an Ethernet address.

After the network ID is obtained in step S101, as described above, the process in FIG. 9 obtains a user ID in step S102.

In step S103, the process obtains appendant information when image data sent from the host computer includes the appendant information.

In step S104, the process obtains the present time as a printing time.

The obtained pieces of information are stored in a memory for the encryption information 306 (shown in FIG. 3), and are sent to the specific pattern generating circuit 304.

In step S105, the encrypted information stored in the ROM 305, such as a machine type, a serial number, and a manufacturer name, is read, and is sent to the specific pattern generating circuit 304, with the obtained encryption information.

In step S106, a specific pattern is created from the encryption information.

In step S107, the process determines whether the present image-forming color (e.g., yellow) is a designated color.

If the process has determined in step S107 that the present image-forming color is not the designated color, it proceeds to step S109, and the addition of the specific pattern to the image data is kept on standby until the time the next image-forming color is formed.

If the process has determined in step S107 that the present image-forming color is a designated color (e.g., yellow), it proceeds to step S108, and adds a specific pattern to the image data.

In step S110, the process determines whether image formation for successive printing is performed, it proceeds back to step S101, and repeatedly performs the same steps for adding a specific pattern.

In the above-described first embodiment, the network for connection is only an example. Obviously, the present invention can be applied under other network environments such as the LocalTalk, and LANtastic.

In the above-described first embodiment, the above-described specific pattern is added to image data. However, the present invention is not limited to the first embodiment.

According to the first embodiment, by adding a specific pattern in a low-visible designated color (e.g., yellow), in particular to, a bank note or a security to be easily forged, or a copyright image, a source of a forged image or an image against copyright can be easily traced based on an image to which the specific pattern is output.

In addition, by providing only an image forming unit with a circuit for adding the specific pattern so that the specific pattern is added to image data, combined effects are obtained in that the limited number of specific pattern adding circuits reduces the production cost and in that no deterioration occurs in the above-described advantage.

Next, a second embodiment of the present invention is described below.

The first embodiment is characterized in that the specific pattern adding circuit 311, provided after the inverter 310c, adds a specific pattern to the inverted PWM image signal output via the D/A converter 307c, the triangular wave generating circuit 308c, the analog comparator 309c, and the inverter 310c.

Conversely, the second embodiment is characterized in that each specific pattern adding circuit, provided before each D/A converter, adds a specific pattern to an image signal before it is converted into a PWM signal.

Figure 12:
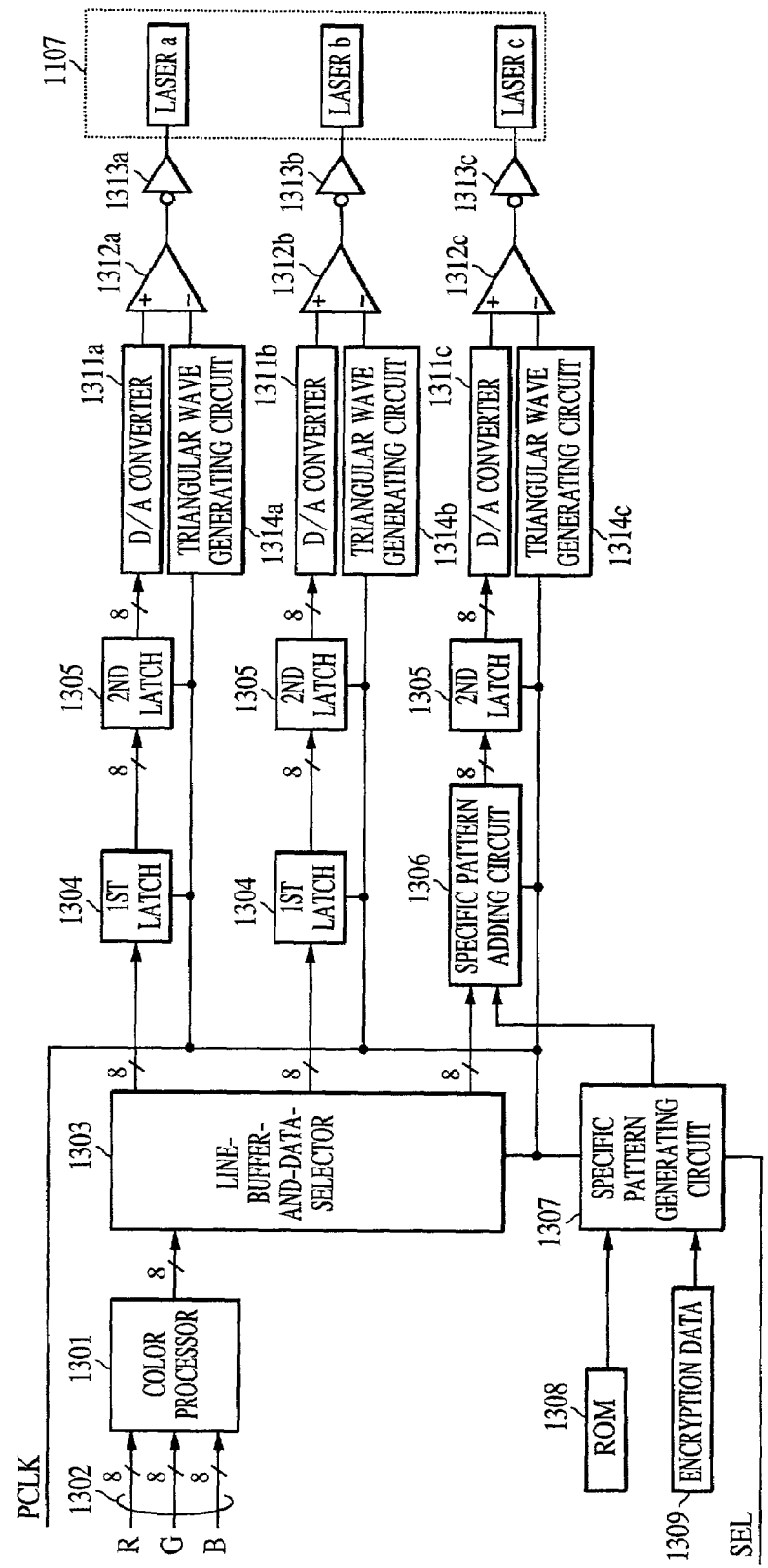
FIG. 12 is a block diagram showing the relationship between image data and a method of adding a specific pattern in a second embodiment of the present invention.

The flow of processing in the second embodiment is shown in FIG. 12. A description of an optical unit 1107 used in the second embodiment is omitted since it generally employs the "Multibeam" or "Triple Beam" method. A color processor 1301 converts RGB 8-bit image data 1302 into the image-forming colors used in the color image forming apparatus according to the first embodiment, and performs density-correcting processing in accordance with output characteristics of the image forming apparatus. Since the image forming apparatus in the second embodiment is a rotary type and sequentially forms images, the color processor 1301 performs corresponding conversion into image-forming data for each screen. Specifically, the color processor 1301 outputs 8-bit image signals. For example, the color processor 1301 first outputs an image signal representing magenta image data, second outputs an image signal representing yellow image data, and third outputs an image signal representing black image data. The image signals are sequentially output from the color processor 1301 to a line-buffer-and-data-selector 1303. Before that, based on information stored in a ROM 1308 and encryption information 1309, a specific pattern generating circuit 1307 generates a specific pattern. As the ROM information and the encryption information, for example, information such as a machine type, a manufacturer name, copyright information, a network environment, and an image forming time is used. An example of the specific pattern is as described in the first embodiment (shown in FIG. 8). Needless to say, it is clear that those excluding the mentioned information may be used as the specific pattern. In the second embodiment, the specific pattern generating circuit 1307 determines based on a SEL signal whether to output a specific pattern, in synchronization with an image-forming color used in the image forming apparatus. In synchronization with PCLK, image data are extracted in units of pixels from the line-buffer-and-data-selector 1303. The image data are extracted for three lasers used in the image forming apparatus in the second embodiment. The extracted image data are sent to two-stage latches, namely, first latches 1304 and second latches 1305 in order that processing for adding the specific pattern may be taken into consideration. When generating no specific pattern, a specific pattern adding circuit 1306 operates similarly to the first latches 1304. When the specific pattern generating circuit 1307 determines to generate the specific pattern, it outputs the specific pattern to the specific pattern adding circuit 1306, in synchronization with the signal PCLK. The specific pattern adding circuit 1306 adds the specific pattern to the image data, in synchronization with the signal PCLK, by using processing such as logical addition to process the image data from the line-buffer-and-data-selector 1303 and the data from the specific pattern generating circuit 1307. The image data to which the specific pattern is added is input to a D/A converter 1311c via the second latch 1305, and the other image data are input to D/A converters 1311a and 1311b via the second latches 1305. Each of the D/A converters 1311a to 1311c converts the input data into an analog voltage corresponding to the signal level of the input data, and inputs the analog voltage to one terminal of each of analog comparators 1312a to 1312c. Each of triangular wave generating circuits 1314a to 1314c generates triangular-wave signal based on the signal PCLK, and inputs the generated waves to another input terminal of each of the analog comparators 1312a to 1312c. The analog comparators 1312a to 1312c each compare the analog voltage and the triangular-wave signal, and each output a PWM image signal. Inverters 1313a to 1313c each invert the PWM image signal to generate an inverted PWM image signal. The inverted PWM image signals are input to laser a to laser c, which are semiconductor lasers or the like.

According to the second embodiment, by providing the specific pattern adding circuit 1306 before the D/A converter 1311c, a specific pattern is added to an image signal before it is converted into a PWM signal. In other words, similarly to the first embodiment, by adding a specific pattern having a low-visible designated color (e.g., yellow) in particular to, a bank note or a security to be easily forged, or a copyright image, etc., a source of a forged image or an image against copyright can be easily traced based on an image to which the specific pattern is output.

In addition, by providing only an image forming unit with a circuit for adding the specific pattern so that the specific pattern is added to image data, combined effects are obtained in that the limited number of specific pattern adding circuits reduces the production cost and in that no deterioration occurs in the above-described advantage.

In the first embodiment and the second embodiment, the case where a specific pattern adding circuit is fixedly provided to one image forming unit. However, a third embodiment of the present invention is characterized in that a selector is used to connect a specific pattern adding circuit to one of a plurality of image forming units.

Figure 13:
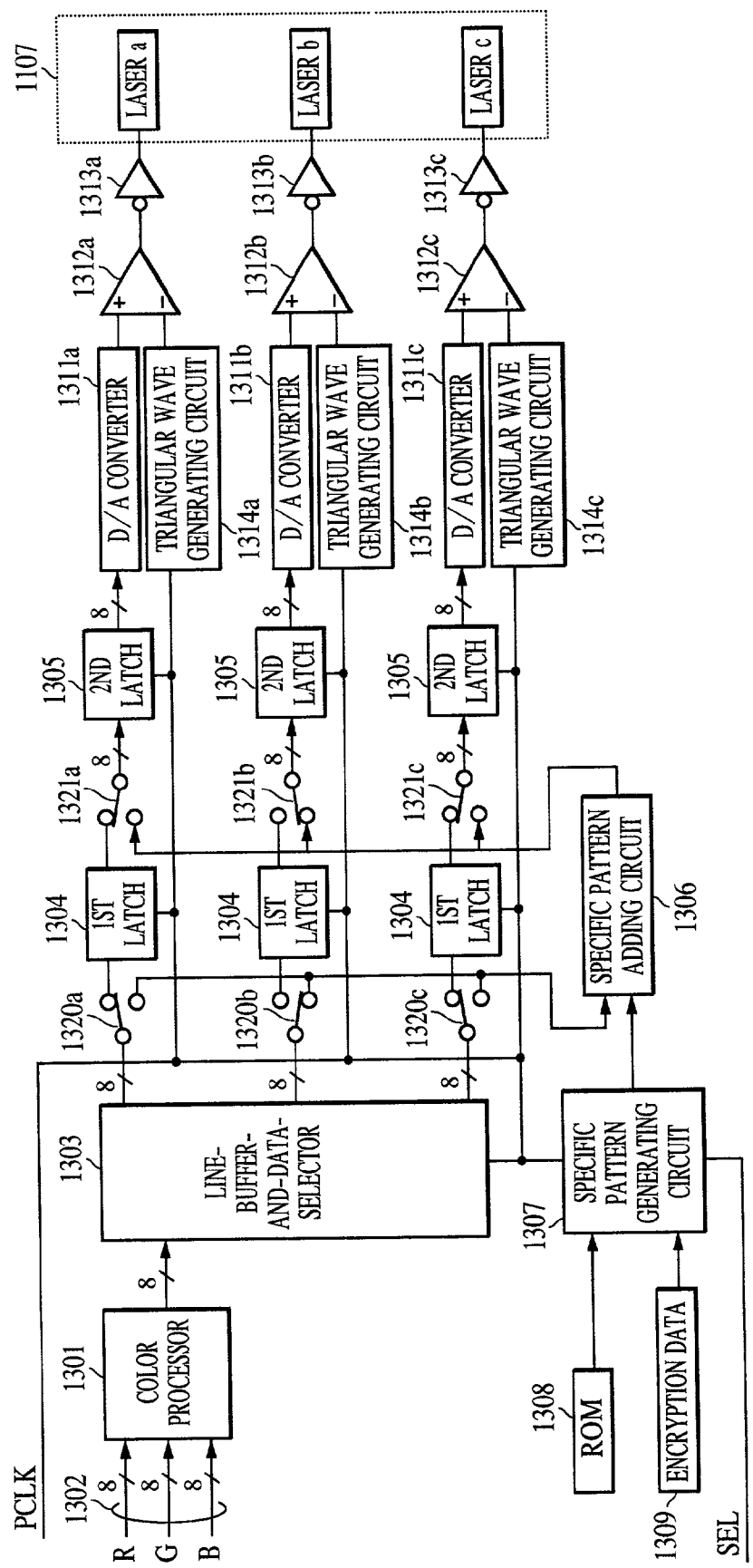
FIG. 13 is a block diagram showing the relationship between image data and a method of adding a specific pattern in a third embodiment of the present invention.

The flow of processing in the third embodiment is shown in FIG. 13. FIG. 13 shows a case in which selectors are provided in the construction (shown in FIG. 12) of the second embodiment which has the specific pattern adding circuit 1307 provided before each D/A converter. Obviously, the selectors can be provided in the construction (shown in FIG. 3) of the first embodiment which has the specific pattern adding circuit 311 provided after the inverter 310c.

In FIG. 13, switches 1320a to 1320c and 1321a to 1321c are used as the selectors. In a basic process for selection, specific patterns are formed by a plurality of image forming units at an inspection stage before shipping the image forming apparatus, and an image forming unit corresponding to the lowest visible physical sector number is selected. At this time, only an image forming unit that is selected by one of the switches 1320a to 1320c and one of the switches 1321a to 1321c is connected to a specific pattern adding circuit 1306. The other image forming units are connected to the first latches 1304. In the case of FIG. 13, the switches 1320b and 1321b are connected to the specific pattern adding circuit 1306. When the image forming units have similar performance, they may be arbitrarily selected in accordance with an image to be formed or an operating environment by a CPU or an MPU (not shown) in the image forming apparatus.

As described above, according to the third embodiment, by providing selectors for selectively connecting a specific pattern adding circuit to one of a plurality of image forming units, an additional dot structure is not limited to the structures (structures each composed of pixels having densities of yellow is modulated is divided into three parts in a sub-scanning direction) described using FIGS. 4 and 5, but can be freely formed.

Figure 14:
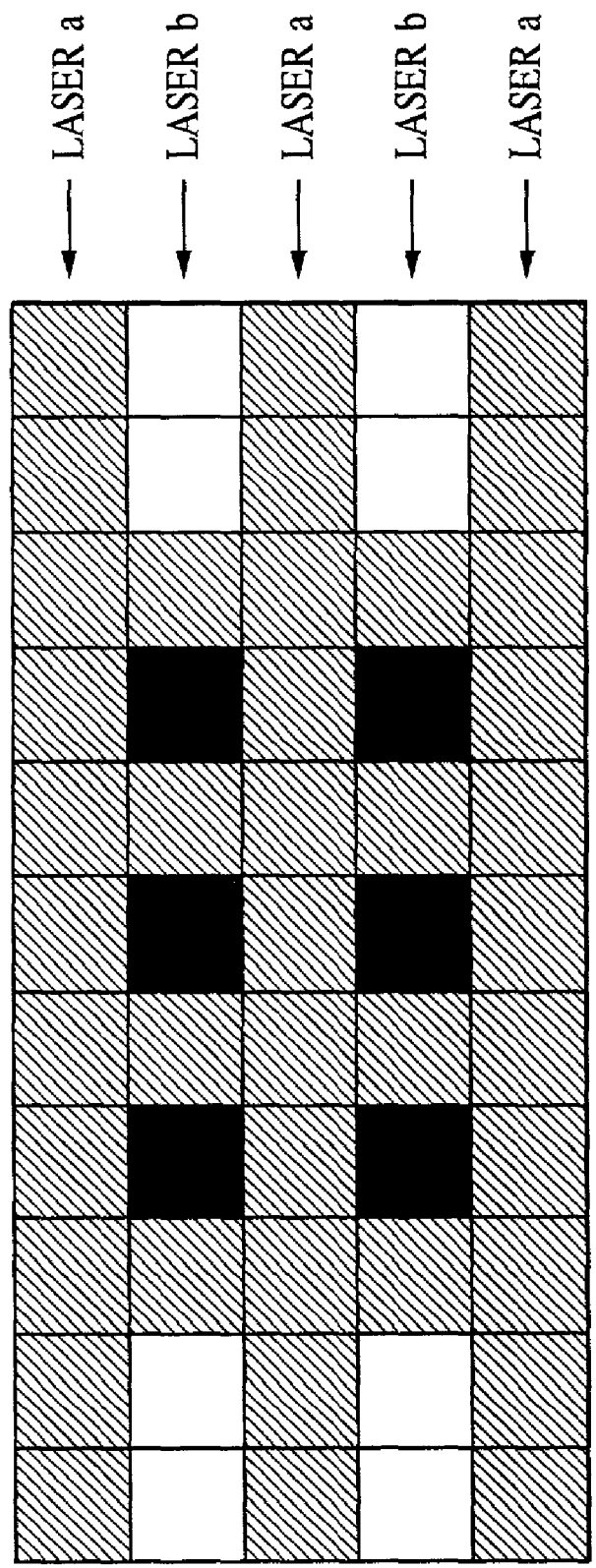
FIG. 14 is an illustration of one dot of a specific pattern in another embodiment of the present invention.

In the first, second, and third embodiments, a construction has been described which employs the Triple Beam method using three lasers and which adds a specific pattern. However, by employing the Double Beam method using two beams, a specific pattern may be added. The specific pattern added by the Double Beam method is formed as shown in FIG. 14. Since an additional dot is formed using only the laser b, as shown in FIG. 14, a specific pattern adding circuit may be provided only for an image signal to the laser b, similarly to the first, second, and third embodiments. Also, six pixels bearing yellow strongly interact with one another in a highlighted portion to easily form a large dot because they are close to one another. The additional dot shown in FIG. 14 is more advantageous than those shown in FIGS. 4 and 5 in that when it is embedded in spots, it can be more easily extracted.

Although the Triple Beam method or the Double Beam method is employed in the first, second, and third embodiments, the number of lasers is not limited to that in each embodiment but it may be plural.

Although the specific pattern adding circuit is provided corresponding to one of a plurality of lasers in the first, second, and third embodiments, it may be provided corresponding to two lasers. In other words, any number of specific pattern adding circuits may be provided if it corresponds to not all lasers but one or some of the lasers.

In the first, second, and third embodiments, the specific pattern may be added to the entirety or part of the image.

Although a laser beam printer has been described as an example in the first, second, and third embodiments, obviously, the present invention can be applied to other types of ink jet printers and LED printers.

In the first embodiment, steps S101 to S104 (shown in FIG. 9) are executed by a printer driver. However, the processing may be executed, for example, by a controller of the printer.

In order to enable the above-described functions of the foregoing embodiments, the present invention may be applied to either a system composed of a plurality of apparatuses (e.g., a host computer, an interface unit, a reader, a printer, etc.) or a single apparatus (e.g., a copying machine, a facsimile machine, etc.).

The scope of the present invention includes an embodiment of the present invention in which, by supplying the program code of software for implementing the functions of the foregoing embodiments to a computer (e.g., a CPU or an MPU) provided in an apparatus or a system connected to various devices for driving the devices, the stored program in the computer controls the devices to operate so that the functions of the foregoing embodiments can be implemented.

In this case, it may be said that the program code itself implements the functions of the foregoing embodiments. Accordingly, the present invention provides the program code itself and an apparatus or device for supplying the program code to the computer. In other words, the present invention provides a storage medium in which the program code is stored.

As the storage medium containing the program code, for example, a floppy disk, a hard disk, an optical disk, a magneto-optical disk, a CD-ROM, a magnetic tape, a non-volatile memory card, and a ROM can be used.

In addition, not only when the functions of the foregoing embodiments are implemented such that a computer executes a supplied program code, but also when the functions of the foregoing embodiments are implemented such that the program code operates cooperatively with an operating system running on the computer or with application software, the program code is obviously included in the foregoing embodiments of the present invention.

Moreover, the present invention also includes a case in which after a supplied program code is stored in an add-in board of a computer or in a memory provided in an add-in unit connected to the computer, the functions of the foregoing embodiments are implemented such that the stored program code controls a CPU or the like of the add-in board or the add-in unit to perform all or part of actual processing.

As described above, according to the present invention, by providing not all light-emitting devices but some of the devices with an adding unit for adding predetermined information (e.g., information unique to an apparatus and information on the copyright of an image) to image information so that the information is imperceptible to human eyes, the predetermined information can be added, even if a plurality of image forming units are used in accordance with accelerated image formation. Also, the production cost can be reduced.

When predetermined information is added to image information, by supplying the predetermined information to not all light-emitting devices but one or some of the light-emitting devices, the information adding method can be simplified.

The predetermined information is added to image information by adding a specific pattern so that the specific pattern is imperceptible to human eyes, in units of dots in each of which a region composed of pixels having densities of a color is divided into a plurality of parts. This enables the addition of the predetermined information so that the predetermined information can be easily extracted, while suppressing deterioration in image quality.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus for forming an image, comprising:
   a plurality of light-emitting devices used for each color;
   input means for inputting image information representing the image;
   a plurality of circuits, each connecting a different one of said light emitting devices to said input means; and
   adding means for adding a specific pattern in a low-visibility designated color to the input image information in at least two of, but not all of said circuits so that said adding means is provided for each of the at least two of, but not all of, the light-emitting devices.

2. An image processing apparatus according to claim 1, wherein said adding means add the predetermined information to analog image information so that the added information is imperceptible to human eyes.

3. An image processing apparatus according to claim 1, wherein said adding means add the predetermined information to digital image information so that the added information is imperceptible to human eyes.

4. An image processing apparatus according to claim 1, wherein the predetermined information includes information which is unique to said image processing apparatus.

5. An image processing apparatus according to claim 4, wherein the information which is unique to said image processing apparatus includes at least one of a network environment for said image processing apparatus, a manufacturer name, a machine type, and a serial number.

6. An image processing apparatus according to claim 1, wherein the predetermined information includes information on the copyright of the image.

7. An image processing apparatus according to claim 1, wherein the predetermined information is cyclically added to the image.

8. An image processing apparatus according to claim 1, wherein the predetermined information is added to the entirety or part of the image.

9. An image processing apparatus according to claim 8, wherein the color component is a yellow component.

10. An image processing apparatus according to claim 1, wherein said adding means add the predetermined information to a color component of the image information which is less perceptible to human eyes than are other colors.

11. An image processing apparatus according to claim 1, wherein said adding means add a specific pattern to the input image information, such that the predetermined information is added to the input image information so that the predetermined information is imperceptible to human eyes.

12. An image processing apparatus according to claim 11, wherein the specific pattern is formed in units of dots in each of which a region composed of pixels having modulated densities of a color is divided into a plurality of parts in a sub-scanning direction.

13. An image processing apparatus according to claim 1, further comprising an image forming means for forming an image based on the image information to which the predetermined information is added by said adding means.

14. An image processing method for forming an image by using a plurality of light-emitting devices for each color, said image processing method comprising the steps of:
   inputting image information representing the image;
   transmitting the image information to the plurality of light-emitting devices over a plurality of circuits, each transmitting the image information to a different one of the light-emitting devices so that each light-emitting device receives the image information from only its associated circuit; and
   adding a specific pattern in a low-visibility designated color to the input image information as it is transmitted to the plurality of light-emitting devices in at least two of, but not all of said circuits so that the specific pattern is supplied to at least two of, but not all of, the light-emitting devices.

15. A computer-readable storage medium containing an image-processing-program code for forming an image by using a plurality of light emitting devices for each color,
   wherein said image-processing-program code includes:
   an input code for inputting image information representing the image;
   a transmitting code for transmitting the image information to the plurality of light-emitting devices over a plurality of circuits so that each light-emitting device receives the image information from only its associated circuit; and
   an adding code for adding a specific pattern in a low-visibility designated color to the input image information as it is transmitted to the plurality of light-emitting devices in at least two of, but not all of said circuits so that the specific pattern is added, for at least two of, but not all of, the light-emitting devices.

16. An image processing apparatus for forming an image, comprising:
   a plurality of light-emitting devices used for each color;
   input means for inputting image information representing the image;
   a plurality of circuits, each connecting a different one of said light-emitting devices to said input means; and
   adding means for adding a specific pattern in a low-visibility designated color to the input image information in at least one of said circuits so that said adding means adds the specific pattern via at least one of the light-emitting devices,
   where said adding means is arranged to add the specific pattern to the input image information via only one of the light-emitting devices.

* * * * *

UNITED STATES PATENT AND TRADEMARK OFFICE
CERTIFICATE OF CORRECTION

PATENT NO. : 7,196,804 B2
APPLICATION NO. : 09/725035
DATED : March 27, 2007
INVENTOR(S) : Hiroyuki Hamazaki It is certified that error appears in the above-identified patent and that said Letters Patent is hereby corrected as shown below:

On the title page, item:

[57] ABSTRACT

Line 6, "y" should read --by--.

COLUMN 1

Line 18, "in" should read --in the--.
    Line 65, "the a" should read --the--.

COLUMN 8

Line 38, "Apple Talk" should read --AppleTalk--.

COLUMN 10

Line 40, "signal" should read --signals--.
    Line 65, "embodiment," should read --embodiment, there is--.

COLUMN 11

Line 33, "(structures each" should read --(each structure--; and
        "pixels having" should read --pixel having modulated--.
    Line 34, "modulated is" should be deleted.

COLUMN 13

Line 21, "light emitting" should read --light-emitting--.

UNITED STATES PATENT AND TRADEMARK OFFICE
CERTIFICATE OF CORRECTION

PATENT NO. : 7,196,804 B2
APPLICATION NO. : 09/725035
DATED : March 27, 2007
INVENTOR(S) : Hiroyuki Hamazaki It is certified that error appears in the above-identified patent and that said Letters Patent is hereby corrected as shown below:

COLUMN 14

Line 29, "light emitting" should read --light-emitting--.

Signed and Sealed this

Thirteenth Day of November, 2007

JON W. DUDAS
*Director of the United States Patent and Trademark Office*